Oct. 2, 1962  A. MUSSCHOOT  3,056,488
ELASTIC STRUT CONVEYOR MOUNT
Filed June 5, 1959  3 Sheets-Sheet 1
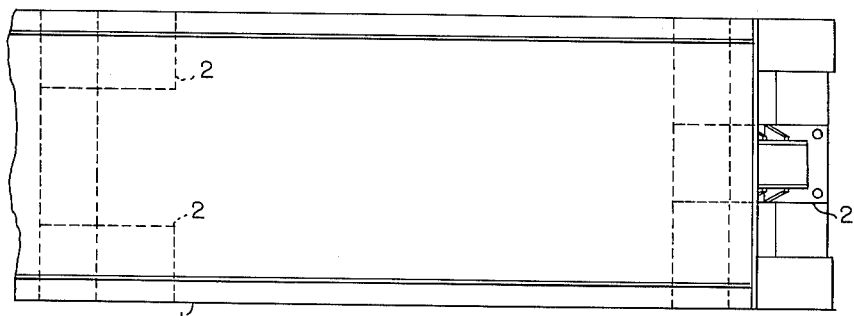
Fig. II
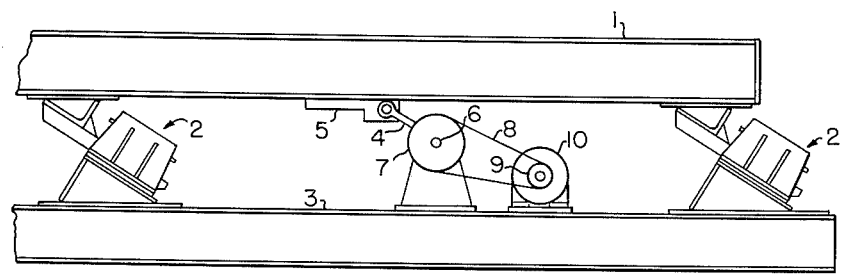
Fig. I
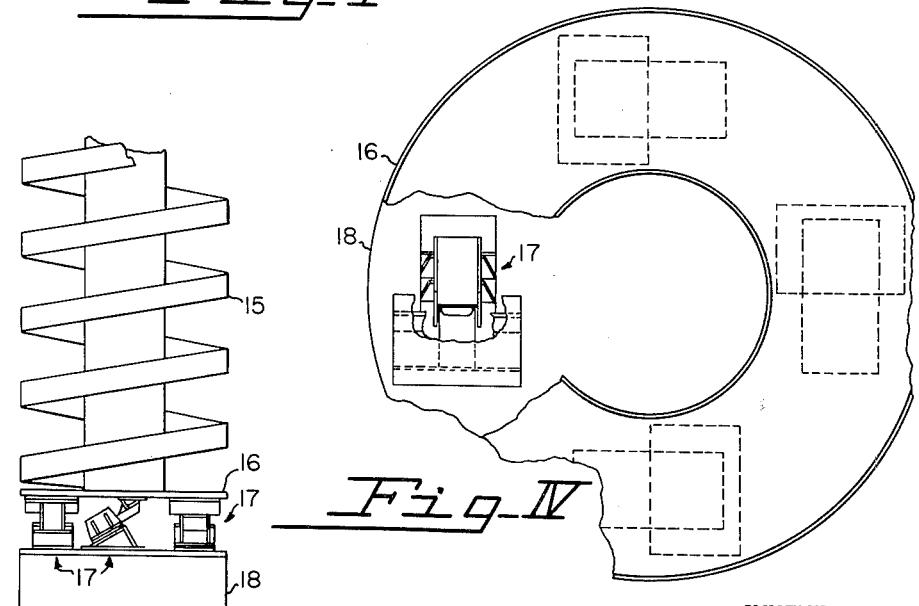
Fig. III   Fig. IV
INVENTOR.
ALBERT MUSSCHOOT
BY
Marshall, Marshall & Yeasting
ATTORNEYS Oct. 2, 1962 A. MUSSCHOOT 3,056,488
ELASTIC STRUT CONVEYOR MOUNT
Filed June 5, 1959 3 Sheets-Sheet 2
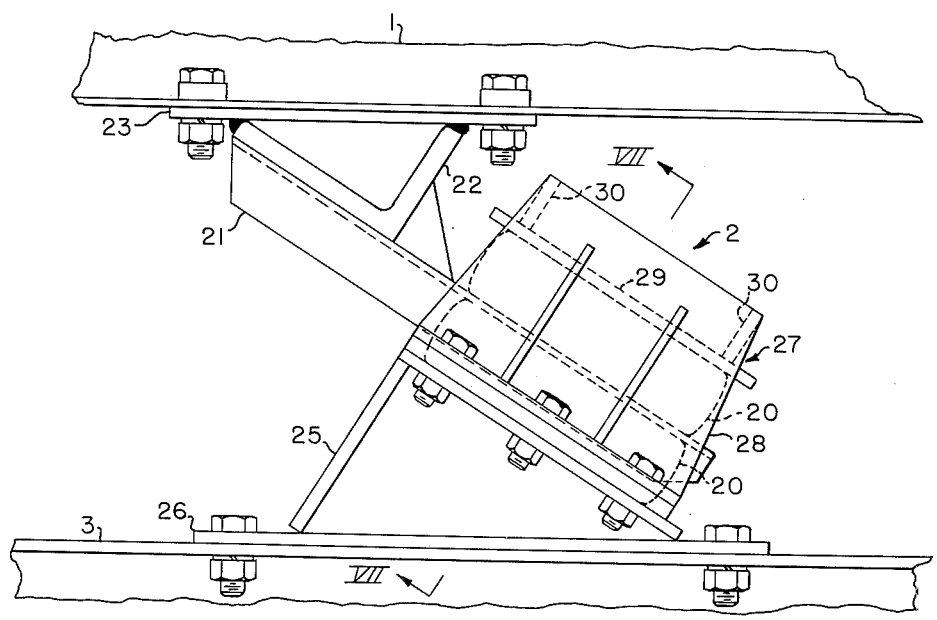
Fig. VI
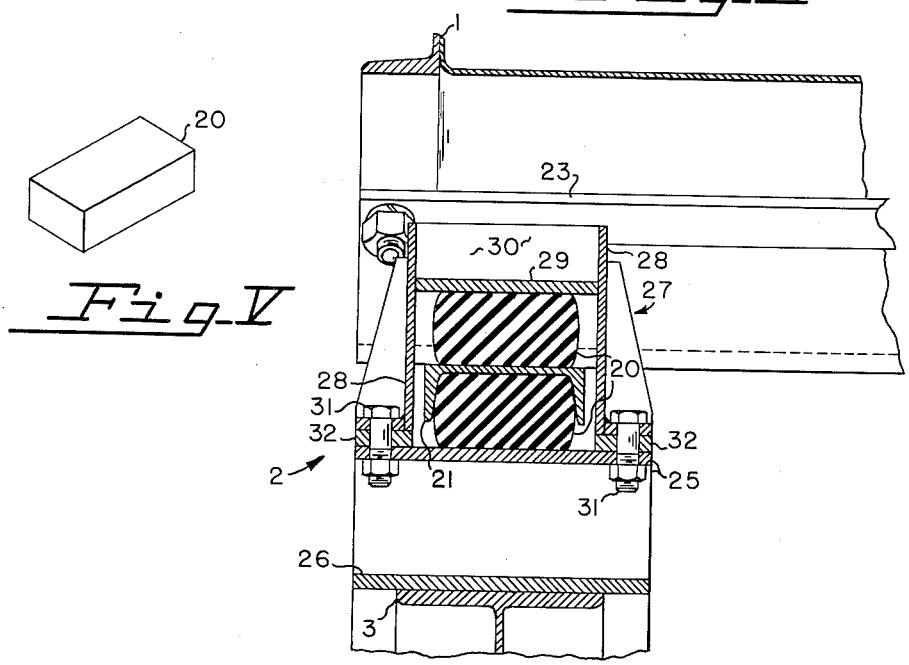
Fig. V
Fig. VII
INVENTOR.
ALBERT MUSSCHOOT
BY
Marshall, Marshall & Yeasting
ATTORNEYS Oct. 2, 1962
A. MUSSCHOOT
3,056,488
ELASTIC STRUT CONVEYOR MOUNT
Filed June 5, 1959
3 Sheets-Sheet 3
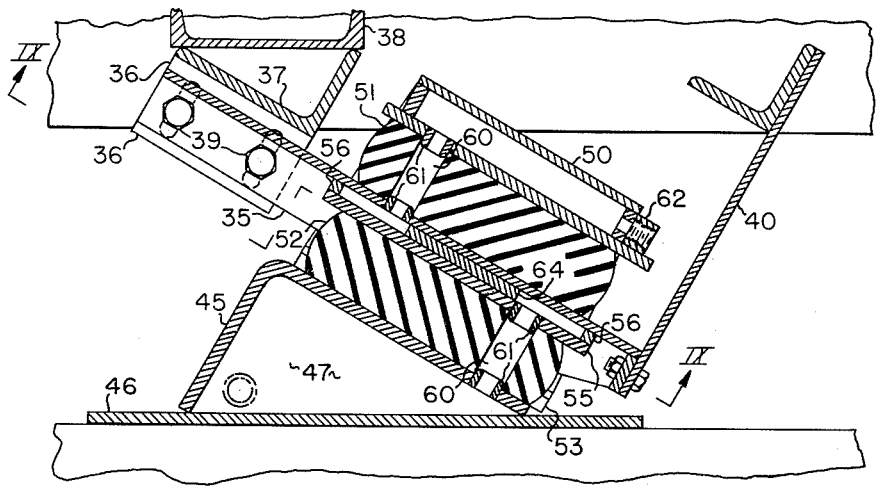
Fig. VIII
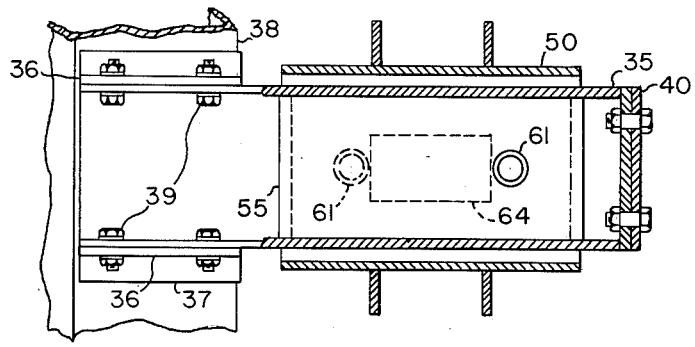
Fig. IX
INVENTOR.
ALBERT MUSSCHOOT
BY
Marshall, Marshall & Yearing
ATTORNEYS United States Patent Office 3,056,488
Patented Oct. 2, 1962

3,056,488
ELASTIC STRUT CONVEYOR MOUNT
Albert Musschoot, Anchorage, Ky., assignor, by mesne assignments, to Chain Belt Company, Milwaukee, Wis., a corporation of Wisconsin
Filed June 5, 1959, Ser. No. 818,323
2 Claims. (Cl. 198—220)

This invention relates to vibratory conveyors and in particular to an improved, simplified mounting for such a conveyor.

In the design of the resilient mounts for vibratory apparatus, such as vibratory conveyors and similar equipment, it has been customary to provide links or cantilever springs to guide the conveyor or other work member along the desired path of vibration and to provide other resilient members such as coil springs to resiliently resist motion of the conveyor or other vibratory work member along such work path. These arrangements, while satisfactory from an engineering standpoint, are expensive to build and to maintain.

The principal object of this invention is to provide an improved resilient mounting for a vibratory work member in which mounting resilient members in the form of rubber or elastomer blocks shaped like ordinary bricks, act not only as the resilient members of a resonant system that vibrates along the desired work path but also as struts to maintain the work member in position and also to provide resiliency in a direction at right angles to the work path and to the struts to minimize the transmission of vibratory force in a lateral direction.

Another object of the invention is to provide an extremely simple, rugged mounting employing rubber as the resilient element.

A still further object of the invention is to provide an improved resilient mounting that may be used with equal facility for straight line conveyors and for helical conveyors.

A still further object of the invention is to provide the simple, rugged resilient mount employing rubber or elastomer blocks as resilient elements that are provided with water passages whereby the adjacent members of the resilient mounting may be readily water-cooled.

More specific objects and advantages are apparent from the following description of a preferred form of the invention.

According to the invention, the improved resilient mounting comprises an open-ended box-like frame in which a pair of elastomer blocks are compressed with a longitudinally extending tongue or bracket of the work member sandwiched between the compressed blocks. The blocks preferably are rectangular parallelepipeds in their unstressed condition and are approximately twice as wide as they are thick and twice as long as they are wide. These dimensions may be varied over a substantial range although dimensions approximating the proportions given are preferred. The blocks are preferably oriented so that gravity forces from the work member are taken principally in compression along the minimum dimension of the block to provide maximum stability, the forces of vibration along the work path are absorbed in shear along the major dimension, the length of the blocks, while transverse lateral forces are absorbed by shear in the direction of the intermediate dimension of the blocks. In this orientation the mountings exhibit maximum stiffness as a strut in the direction of compression, exhibit intermediate stiffness to operate as a spring in forming a resonant system in the direction of shear lengthwise of the block and have a low resiliency in shear transversely to avoid any resonant vibrations in a horizontal transverse direction. If cooling is required, the blocks also serve as coolant conduits to connect cooling chambers included in the tongue and in the boxlike frame.

A preferred embodiment of the invention is illustrated in the accompanying drawings.

In the drawings:

FIG. I is a side elevation of a vibratory conveyor employing the improved resilient mountings.

FIG. II is a plan view of the conveyor illustrated in FIG. I.

FIG. III is a fragmentary side elevation of a helical conveyor employing the improved resilient mountings.

FIG. IV is a plan view with parts broken away and parts shown in section of the helical conveyor shown in FIG. III.

FIG. V is an isometric view of one of the rubber or elastomer blocks used as a resilient element in the improved resilient mounting.

FIG. VI is an enlarged side elevation of one of the resilient mountings.

FIG. VII is a cross section of the mounting taken substantially along the line VII—VII of FIG. VI.

FIG. VIII is a vertical section of a similar resilient mounting arranged for water cooling of the metallic elements thereof.

FIG. IX is a fragmentary view of a portion of the mounting as seen from the line IX—IX of FIG. VIII.

These specific figures and the accompanying description are intended merely to illustrate the invention and not to impose limitations on its scope.

As illustrated in the drawings a vibratory work member such as a conveyor trough 1, FIG. I, is supported by a plurality of resilient mounts 2 from a base 3. The vibratory member 1 may be driven by a mechanism comprising a connecting rod 4 one end of which is pivotally attached to a bracket 5 depending from the conveyor trough 1 and the other end of which is connected to a crank or eccentric, not shown, of a crank shaft 6 that also carries a pulley 7 connected through a belt 8 to a drive pulley 9 of a motor 10.

While not shown in the drawings any of a number of well known relief mechanisms may be employed in the crank-connecting rod mechanism to minimize the static loads applied to the crank mechanism. Such mechanisms are desirable in that it is difficult to maintain the adjustment of the resilient mountings so that they carry all of the static load of the conveyor member 1 plus the average load of material in the conveyor with no static load carried by the crank shaft or connecting rod.

The improved mountings may be employed in pairs along the length of the conveyor or, for relatively short conveyors, may be arranged with a pair near the discharge end of the conveyor and a single mounting near the head end of the conveyor. The latter arrangement is illustrated in FIG. II in which a pair of the resilient mountings 2 are shown under the left end of the conveyor and a single mounting is shown supporting the right end of the conveyor.

One of the peculiar advantages of the improved resilient mounting is its universal resilience in that is can accommodate twisting movement between its members as readily as it can accommodate translatory movement. This makes it peculiarly well adapted for helical conveyors where the mountings are distributed around the base at a substantial distance from the axis of the helix and are thus each subjected to a twisting motion as well as the movement in translation along the work path of the vibratory member. This use of the improved mounting is illustrated in FIGS. III and IV which show a helical conveyor 15 carried on a sub-base 16 which in turn is resiliently supported by a plurality of the improved mountings 17 from a stationary base 18. Preferably the resilient mountings 17 are the same as the resilient mountings 2 and, as shown in FIG. IV, are arranged symmetrically with respect to the axis of a helical conveyor 15. While it is desirable, in the case of the helical arrangement, that the longitudinal axis of each improved resilient mounting be arranged tangent to the circle through the set of mountings for the helical conveyor and concentric with the axis, such an arrangement is not essential because the improved mountings can accommodate a substantial amount of radial motion in addition to the tangential motion along the helical path. Therefore, the mountings are shown in FIGS. III and IV as being displaced slightly from such tagential position.

The construction of the improved resilient mounting is shown in greater detail in FIGS. V, VI and VII. One of the resilient blocks or resilient elements 20 is shown in FIG. V. A practical size for such an element is approximately 2½" in thickness by 4" in width by 8" in length. These dimensions are approximately in the ratio of the width being twice the thickness and the length being twice the width.

As illustrated more clearly in FIG. VI the improved resilient mounting 2 includes, for attachment to the conveyor 1, a tongue 21 in the form of a length of channel ion that is welded or otherwise securely attached to a transverse piece of angle iron 22 which in turn is welded to a plate 23 attached to the under side of the vibratory work member such as the conveyor 1.

As appears most clearly in FIG. VII the resilient blocks 20 with the tongue 21 sandwiched therebetween are held compressed in a base portion of the resilient mounting 2. This portion comprises an angle iron 25 that is welded or otherwise secured to a plate 26 that is belted to the base 3 and a saddle 27 that is U-shaped in form. The saddle 27 which straddles the sandwiched stack of resilient blocks includes side members 28 bolted to a flange of the angle iron 25 and a top plate 29 that bears on the upper resilient member 20. The top plate 29 is reinforced by webs 30 extending between the upper ends of the side members 28. The lower edges of the side members 28 of the saddle 27 are bolted, as by means of bolts 31, to the angle iron 25 with spacers 32 interposed between the adjacent surfaces of the angle iron and the turned edges of the bottoms of the side members 28. The spacers 32 may be varied in thickness to vary the amount of compression imposed upon the resilient members 20.

The saddle 27 is preferably dimensioned so that when it is pulled down tight by the bolts 31 against the spacers 32 the rubber or resilient blocks 20 are compressed to approximately 80 percent of their original height or free thickness. This 20 percent compression exerts enough force on the rubber or resilient members so that the friction between such members and the saddle and base member 25 and between the members and the tongue 21 is sufficient to prevent any relative motion or slipping between the blocks and the adjacent metal surfaces. Accordingly, the blocks 20 constituting resilient members are not bonded to the adjacent metallic surfaces but rather are merely placed in position and then compressed by the clamping pressure exerted by the U-shaped saddle 27. This construction makes it very simple to replace the resilient members should such replacement become necessary.

Vibratory conveyors are often used in locations where other types of conveyors are entirely unsatisfactory. Some such locations are, for example, in plants processing sintered materials where a conveyor must handle extremely hot products. Since any of the elastomers that have sufficient elasticity to be used as a resilient member in the improved mounting are sensitive to heat and deteriorate rapidly if exposed to high temperatures it is necessary to provide some means for protecting the resilient elements when the conveyor is located in a particularly hot environment or is handling hot materials. A preferred arrangement for water cooling the metallic surfaces of the improved mounting that contact the resilient elements is illustrated in FIGS. VIII and IX. As shown in FIG. VIII the mounting is similar to that shown in FIG. VI and includes a channel iron tongue 35 which at its upper end has its side flanges bolted to downwardly directed plates 36 that are welded in spaced apart relation to the lower side of an angle iron 37 which in turn is welded to a structural member 38 of the conveyor or other work performing member. Bolts 39, by which the tongue is bolted to the plates 36, pass through slotted holes in the plates 36 so that the tongue may be adjusted in position relative to the angle iron 37. Furthermore, in this arrangement the lower end of the tongue 35 is braced by a separate strut 40 that extends from the lower end of the tongue 35 to another angle iron 41 attached to the work member.

The base portion of this improved water cooled mounting comprises an angle iron 45 welded or otherwise secured to a base plate 46 that may be bolted to a foundation or base structure of the equipment. The angle iron 45 is provided with end plates 47 so as to, in combination with the base plate 46, form a water tight enclosure. A saddle 50 similar to the saddle 27 shown in FIGS. VI and VII except for including a water chamber in its upper part, serves to compress and frictionally hold a sandwich, comprising a pair of rubber blocks 51 and 52 together with the tongue 35, against the base angle iron 45. In this structure, as in that shown in FIG. VI, a spacer 53 located below a lower flange of the side wall of the stirrup 50 adjusts the amount of compression to which the rubber is subjected.

For water cooling purposes, the flat surface of the tongue 35 interposed between the rubber blocks 51 and 52 is formed with an additional plate 55 that is spaced from the web of the channel iron by spacers 56 so as to form a thin water chamber.

Each of the rubber blocks 51 and 52 is provided with a bore or hole 60 that fits over short nipples 61 pressed into holes drilled in the surfaces of the angle iron 45, the tongue 35, the lower surface of the stirrups 50 and the plate 55 which cooperates with the tongue 35 to form the water chamber in the tongue. The holes in the angle iron 45 and plate 55 are alined with each other and, likewise, the holes in the tongue 35 and in the saddle 50. The nipples 61 extend into the passages in the rubber only sufficiently far to locate the rubber. The rubber blocks 51 and 52 thus serve as flexible conduits for conducting the water from the fixed portions of the base-mounted part of the resilient support to the tongue which moves relative to the base. This avoids the necessity for any other flexible connections to conduct the water to the various pieces requiring cooling.

The flow of the cooling water is preferably from the chamber under the angle iron 45, through the passage 60 in the rubber block 52 into the water chamber between the flat surface of the tongue 35 and the plate 55, thence through the passage 60 in the rubber block 51 into the chamber in the upper part of the saddle and out through a fitting 62 that may be connected to the lower chamber of the next one of the mountings. A spacer plate 64 occupying the central portion of the chamber between the web of the tongue 35 and the plate 55 serves both to stiffen the plate 55 against the pressure exerted by the rubber and also to divert the flow of cooling water to the sides of the chamber where a greater amount of heat is being received. The flow past the sides of the plate 64 causes a swirling motion at the upper end of the chamber in the tongue so as to sweep the air out of the pocket at the upper end and completely water fill this chamber.

It is preferable, since a uniform temperature is not required in the various mountings, to connect the water chambers of the various resilient mountings included in a particular installation in series so that all of the water flows through each of the chambers. This ensures a continuous flow of water to all of the cooling chambers. If the various mountings were connected in parallel to the water supply, any additional restriction in one of the flow paths would divert water to the other mountings thus allowing the restricted one to overheat. If it is necessary to connect the various mountings in parallel to the water supply, it is then necessary to insert a fixed restriction into each of the supply leads or discharge leads so as to properly divide the flow of water to the various mountings.

The improved resilient mounting for supporting a vibratory work member provides a simple, reliable, rugged assembly which not only serves as a strut to support the work member but also serves as a spring to tune the system and thus provide a resonant condition. The limited low resiliency in the transverse direction, provided by stress in shear along the width of the rubber blocks, provides a low resonant frequency for lateral motion which frequency is designed to be below the operating frequency ensures that the conveyor or other work member will not vibrate laterally to any substantial extent and likewise will transmit very little lateral force to the base. Vertical forces transmitted through the rubber in compression are sustained with very little additional deflection of the rubber while the vibratory motion which stresses the rubber in shear parallel to the length of the blocks provides the spring action to cooperate with the work member to form a vibratory system having a natural frequency near the desired operating speed.

In this type of structure, the operating speed rather than spring constant, is selected so that the system operates near a resonant condition. For this purpose the drive motor is preferably provided with a variable diameter pulley, the diameter of which is adjusted to secure the required operating speed of the crank shaft or eccentric weight if such is used.

Various modifications may be made in the details of the particular structure described without departing from the spirit and scope of the invention.

Having described the invention, I claim:

1. A resilient support for a vibratory member comprising, in combination, a channel-shaped tongue extending from said member in line with its path of vibration, an open-ended box frame surrounding said tongue with its open ends spaced apart in the direction of the path of vibration, and elongated spring blocks interposed and compressed to be frictionally held between the surfaces of the web and sides of said channel-shaped tongue and opposing surfaces of the box frame.

2. A resilient support for a vibratory member comprising, in combination, a flat beam extending from said member substantially in line with its path of vibration, reinforcing flanges along the sides of and joined to said flat beam, an open-ended box frame surrounding said beam with its open ends spaced apart in the direction of the path of vibration, and elastomer block springs interposed and compressed to be frictionally held between flat surfaces of said beam and flanges and the opposing interior surfaces of said open-ended box, said block springs each having its least dimension in the direction of compression and its greatest dimension parallel to the path of vibration of the member.

References Cited in the file of this patent

FOREIGN PATENTS

| | | |
|---|---|---|
| 193,798 | Austria | Dec. 10, 1957 |
| 812,033 | Great Britain | Apr. 15, 1959 |